(12) United States Patent
Ferrell et al.

(10) Patent No.: US 8,645,484 B2
(45) Date of Patent: Feb. 4, 2014

(54) MESSAGING SERVICE USING DIFFERENT TEXT MESSAGING CHANNELS

(75) Inventors: William Ferrell, Los Altos Hills, CA (US); Gregor Hochmuth, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/304,868

(22) Filed: Nov. 28, 2011

(65) Prior Publication Data

US 2013/0036179 A1    Feb. 7, 2013

Related U.S. Application Data

(60) Provisional application No. 61/514,410, filed on Aug. 2, 2011.

(51) Int. Cl.
*G06F 15/16* (2006.01)
(52) U.S. Cl.
USPC ........... 709/206; 709/205; 709/207; 709/208; 709/220; 709/225; 709/223; 709/227; 709/238
(58) Field of Classification Search
USPC .................... 709/206, 203, 204, 217–219
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,697,478 B1 | 2/2004 | Meldrum et al. | |
| 6,754,322 B1 | 6/2004 | Bushnell | |
| 6,788,766 B2 * | 9/2004 | Logan | 379/67.1 |
| 7,089,298 B2 * | 8/2006 | Nyman et al. | 709/220 |
| 7,106,848 B1 | 9/2006 | Barlow et al. | |
| 7,321,384 B1 * | 1/2008 | Wu et al. | 348/14.08 |
| 7,328,029 B1 * | 2/2008 | Adamczyk et al. | 455/456.3 |
| 7,366,990 B2 | 4/2008 | Pitroda | |
| 7,493,345 B2 * | 2/2009 | Deguchi et al. | 1/1 |
| 7,552,175 B2 * | 6/2009 | Luo et al. | 709/205 |
| 7,555,110 B2 | 6/2009 | Dolan et al. | |
| 7,610,287 B1 | 10/2009 | Dean et al. | |
| 7,742,468 B2 | 6/2010 | Vagelos | |

(Continued)

FOREIGN PATENT DOCUMENTS

WO     WO02079984     10/2002

OTHER PUBLICATIONS

Adamic et al., "A Social Network Caught in the Web," Internet Journal, First Monday, Jun. 2, 2003, vol. 8, No. 6, pp. 1-22.

(Continued)

*Primary Examiner* — Jude Jean Gilles
(74) *Attorney, Agent, or Firm* — Patent Law Works LLP

(57) ABSTRACT

A system and method for providing a messaging service in a community is disclosed. The system includes a communication interface and a message routing module. The communication interface receives a message from a first member of the community using a first text messaging channel. The message includes a community number identifying the community. The message routing module is communicatively coupled to the communication interface. The message routing module determines one or more second members of the community based at least in part on the community number. The message routing module determines one or more second text messaging channels for the one or more second members. The communication interface sends the message to the one or more second members of the community using the one or more second text messaging channels.

20 Claims, 7 Drawing Sheets

(56) References Cited

U.S. PATENT DOCUMENTS

| | | | |
|---|---|---|---|
| 8,151,116 B2* | 4/2012 | van der Horst et al. | 713/185 |
| 8,224,362 B1* | 7/2012 | Osinga | 455/466 |
| 2002/0137490 A1 | 9/2002 | Gallant | |
| 2002/0143874 A1 | 10/2002 | Marquette et al. | |
| 2004/0258220 A1 | 12/2004 | Levine et al. | |
| 2005/0152521 A1 | 7/2005 | Liljestrand | |
| 2006/0026288 A1 | 2/2006 | Acharya et al. | |
| 2006/0077957 A1 | 4/2006 | Reddy et al. | |
| 2006/0206604 A1 | 9/2006 | O'Neil et al. | |
| 2007/0010265 A1* | 1/2007 | Henderson et al. | 455/466 |
| 2007/0127631 A1 | 6/2007 | Difiglia | |
| 2007/0171898 A1 | 7/2007 | Salva | |
| 2007/0173236 A1 | 7/2007 | Vishwanathan et al. | |
| 2007/0248077 A1 | 10/2007 | Mahle, Jr. et al. | |
| 2007/0289002 A1* | 12/2007 | van der Horst et al. | 726/9 |
| 2008/0056475 A1 | 3/2008 | Brannick et al. | |
| 2008/0114775 A1* | 5/2008 | Deguchi et al. | 707/10 |
| 2008/0192656 A1 | 8/2008 | Vagelos | |
| 2009/0233629 A1* | 9/2009 | Jayanthi | 455/457 |
| 2011/0098156 A1 | 4/2011 | Ng et al. | |
| 2011/0167118 A1* | 7/2011 | Cai et al. | 709/206 |
| 2012/0016932 A1* | 1/2012 | de Castro et al. | 709/203 |
| 2012/0033027 A1* | 2/2012 | Murphy | 348/14.01 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Murchu et al., "Online Social and Business Networking Communities," Digital Enterprise Research Institute DERI Technical Report, National University of Ireland, Aug. 11, 2004, 22 pgs.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

* cited by examiner

*Wferrell* 6:29:01 pm
Sea to SFO we are boarding. Rohan, I have your bag. Come on in...

Sara 6:28:12 pm
Our flight is boarding all rows now

Sara 2:41:14 pm
I think our car is headed to my parents' place (still 20 minutes away) but we will call/message soon

Alan 2:05:03 pm
Come join us for this chowdare! Anthony's home port is near Golden Gardens. Call me when close.

Alisha 12:07:34 pm
Yeah, we're on the taxi

Sara 12:06:36 pm
Has the boat come yet? Does Kathy know

*Wferrell* 11:51:16 am
Will do. We just got to the mainland.

Alisha 11:50:01 am
Hi will somebody make sure to grab the laptop in the plastic bag? Just wanted to make sure y'all knew it belonged to us. Thanks! P.s. we're still on decatur

Andrew 12:06:13 pm
Hi Bill!

Sara 7:25:12 am
Plane group, you need to pick up berries in Anacortes at a roadsign stand or the market grocery store

Chris 12:11:28 am
I'll be at Mt Baker in 20. Pick up please thank you

MESSAGING SERVICE USING DIFFERENT TEXT MESSAGING CHANNELS

CROSS REFERENCE TO RELATED APPLICATIONS

This application claims priority under 35 USC §119(e) to U.S. Application No. 61/514,410, entitled "Messaging Service Using Different Text Messaging Channels" filed Aug. 2, 2011, the entirety of which is herein incorporated by reference.

BACKGROUND

The specification relates to a system and method for providing a messaging service to a set of users, such as a set of users that form a messaging community. In particular, the specification relates to providing a messaging service to users for sharing messages in a messaging community via different text messaging channels.

An online chatting room provides a convenient space for a user to share messages with all the other participants in the room. Messages sent to the chatting room are available to participants in the room and the participants in the room are able to send messages to or receive messages from other participants.

Some existing technologies use a high-end device such as a personal computer to install an application and join conversations using the application. Users with low-end devices have difficulty participating in the conversations because the application may not be able to be installed on the low-end devices.

Some existing technologies also only allow users to join conversations via a single text messaging channel, such as texting, using an application installed on a computer.

SUMMARY OF THE INVENTION

In some examples the specification describes a system and method for providing a messaging service in a messaging community using a messaging service module. In one embodiment, the messaging service module includes a communication interface, a community creation module, a community configuration module, a message routing module, a user account module and a user interface module.

The communication interface transmits information to the relevant module. The community creation module generates a community in response to a request for generating a new community. The community configuration module configures the community in response to a request. The user account module creates a user account and associates the user with a community. The user interface module generates a user interface that displays the messages for a community.

The communication interface receives a message from a first member of the community using a first text messaging channel. The message includes a community number identifying the community. The message routing module determines one or more second members of the community based at least in part on the community number. The message routing module determines one or more second text messaging channels for the one or more second members. The communication interface sends the message to the one or more second members of the community using the one or more second text messaging channels. In one embodiment, the text messaging channel is a short message service, an application or a website.

BRIEF DESCRIPTION OF THE DRAWINGS

The specification is illustrated by way of example, and not by way of limitation in the figures of the accompanying drawings in which like reference numerals are used to refer to similar elements.

FIG. 3A is a graphic representation of an example message flow when messages from a community are transmitted using a SMS channel.

DETAILED DESCRIPTION

Figure 1:
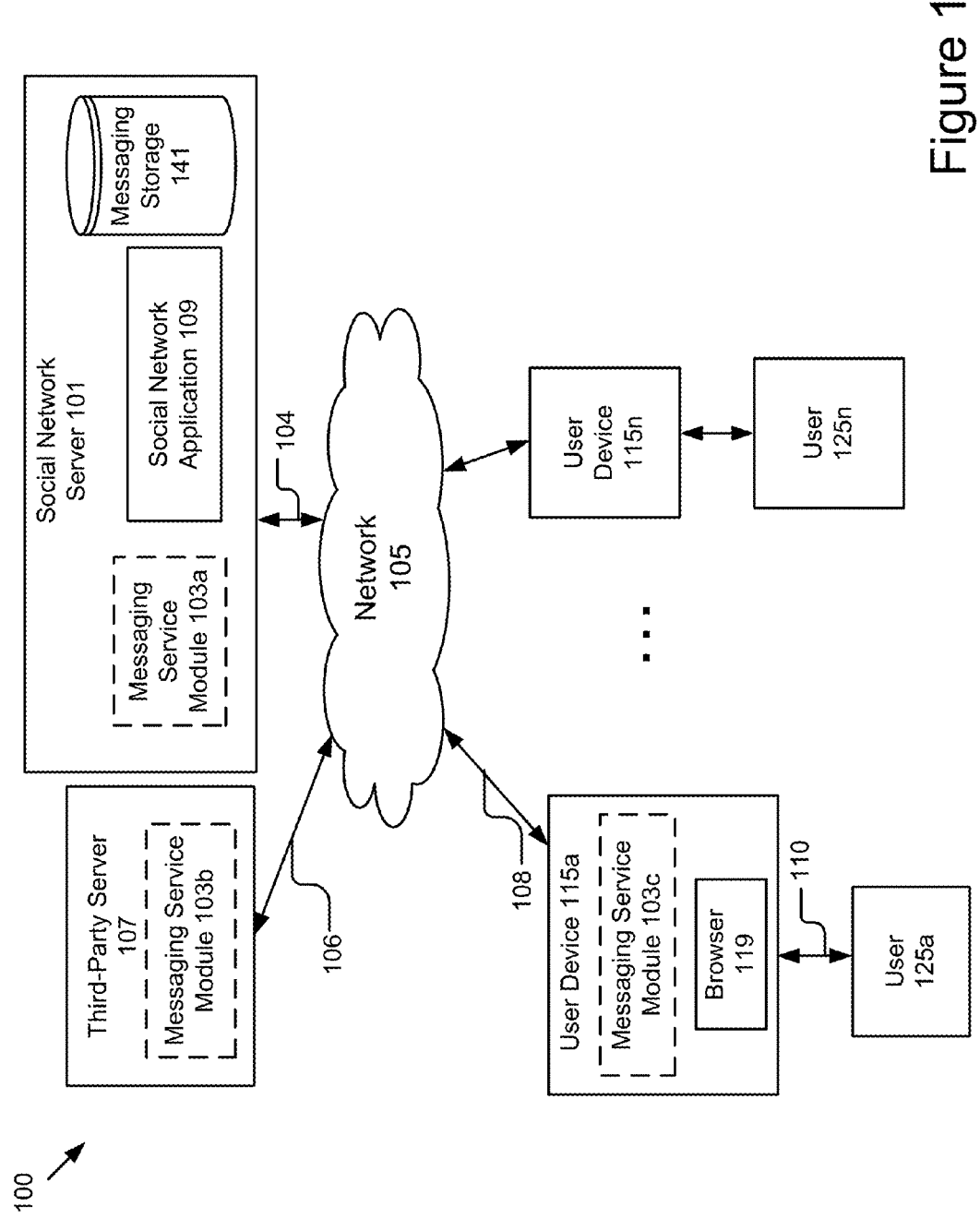
FIG. 1 is a high-level block diagram illustrating one embodiment of a system for providing a messaging service.

A system and method for providing a messaging service in a messaging community are described below. In the following description, for purposes of explanation, numerous specific details are set forth in order to provide a thorough understanding of the specification. It will be apparent, however, to one skilled in the art that the invention can be practiced without these specific details. In other instances, structures and devices are shown in block diagram form in order to avoid obscuring the description. For example, the present embodiment is described in one embodiment below primarily with reference to user interfaces and particular hardware. However, the present embodiment applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

System Overview

FIG. 1 illustrates a block diagram of a system 100 for providing a messaging service according to some examples. The illustrated description of a system 100 for providing a messaging service includes user devices 115a . . . 115n that are accessed by users 125a . . . 125n, a social network server 101 and a third-party server 107. In FIG. 1 and the remaining figures, a letter after a reference number, such as "115a" is a reference to the element having that particular reference number. A reference number in the text without a following letter, such as "115," is a general reference to any or all instances of the element bearing that reference number. In the illustrated embodiment, these entities are communicatively coupled via a network 105.

The user devices 115a . . . 115n in FIG. 1 are used by way of example. While FIG. 1 illustrates two devices, the embodiment applies to any system architecture having one or more user devices. Furthermore, while only one network 105 is coupled to the user devices 115a . . . 115n, the social network server 101 and the third-party server 107, in practice any number of networks 105 can be connected to the entities.

In one embodiment, the messaging service module 103a is operable on the social network server 101, which is coupled to the network 105 via signal line 104. The social network server 101 also includes a social network application 109 and a messaging storage 141. In one embodiment, the social network server 101 is powered by Google®. Although only one social network server 101 is shown, persons of ordinary skill in the art will recognize that multiple servers may be present. A social network is any type of social structure where the users are connected by a common feature, for example, Google Plus. The common feature includes friendship, family, work, an interest, etc. The common features are provided by one or more social networking systems, such as those included in the system 100, including explicitly-defined relationships and relationships implied by social connections with other online users, where the relationships form a social graph. In some examples, the social graph can reflect a mapping of these users and how they are related.

In another embodiment, the messaging service module 103b is stored on a third-party server 107, which is connected to the network 105 via signal line 106. The third-party server 107 includes software for generating a website (not shown). In one embodiment, the notifying application generates a user interface that is incorporated into the website. While only one third-party server 107 is shown, the system 100 could include one or more third-party servers 107.

In yet another embodiment, the messaging service module 103c is stored on a user device 115a, which is connected to the network 105 via signal line 108. The user 125a interacts with the user device 115a via signal line 110. The user device 115a . . . 115n is any computing device that includes a memory (not shown) and a processor (not shown). For example, the user device 115a . . . 115n is a personal computer ("PC"), a cell phone (e.g., a smart phone, a feature phone, a dumb phone, etc.), a tablet computer (or tablet PC), a laptop, etc. One having ordinary skill in the art will recognize that other types of user devices 115a . . . 115n are possible. In one embodiment, the system 100 comprises a combination of different types of user devices 115a . . . 115n.

The user device 115a comprises a browser 119. In one embodiment, the browser 119 is code and routines stored in a memory of the user device 115a and executed by a processor of the user device 115a. For example, the browser 119 is a browser application such as Google Chrome. In one embodiment, the browser 119 presents a graphical user interface (GUI) to a user and allows the user to input information via the GUI. The user 125a . . . 125n is a human user of the user device 115a . . . 115n. Persons of ordinary skill in the art will recognize that the messaging service module 103 can be stored in any combination on the devices and servers.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

The messaging service module 103 receives data for providing a messaging service to users from heterogeneous data sources. In one embodiment, the messaging service module 103 receives data from a third-party server 107, a social network server 101 and user devices 115a . . . 115n. The messaging service module 103 creates a messaging community and provides a messaging service to members in the messaging community. For example, the messaging service module 103 receives a message from a member of a messaging community and delivers asynchronous messages to all the other members of the messaging community. In one embodiment, the messaging service module 103 receives a community configuration request from a member of a messaging community and configures the messaging community in response to the community configuration request.

A messaging community refers to a virtual community formed by a set of users that share messages within the community. A member of a messaging community is a user that joins the messaging community. For example, a messaging community is an online community formed by a group of friends and each friend is a member of the messaging community. A messaging community is herein referred to as a community for simplicity and clarity.

A community has a set of community attributes. A set of community attributes refers to a set of information describing a community. The set of community attributes includes one or more of an owner, a community name, a community number and one or more members of the community except the owner. An owner of a community is a user that initiates the creation of the community. In one embodiment, the owner cannot be changed. The owner is also a member of the community. A community name refers to a name for a community. In one embodiment, the community name is set by the owner of the community. In another embodiment, the community name is automatically generated by the messaging service module 103 based at least in part on a timestamp when the community was created. A community number is a unique number that identifies a community in the system 100. For example, a community number is a unique phone number or a short code representing a community in the system 100.

The community is a private community or a public community. A private community is a community that requires authentication before adding a user as a member, such as approval of a moderator or confirmation that the user is acceptable. A private community shares messages between members of the community that are not viewable by non-members. For example, a community formed by co-workers can be a private community because the members do not want the public to view work messages. A public community is a community that anyone can join (e.g., a public forum).

In one embodiment, a community is one of a location-based community and a topic-based community. A location-based community refers to a community formed according to a location (e.g., a California community, a New York community, etc.). A topic-based community refers to a community formed according to a topic (e.g., a hiking community, a golfing community, etc.).

The messaging service module 103 communicates with users using different text messaging channels. A text messaging channel is a channel for delivering information (e.g., a message) between two or more entities. For example, a text messaging channel is one of a channel via SMS, a channel via an application in a smart phone and a channel via a website. In one embodiment, the messaging service module 103 receives a message from a member of a community via a first text messaging channel and delivers the message to the other members of the community via one or more second text messaging channels. In another embodiment, a user sends messages to and receives messages from the messaging service module 103 via the same text messaging channel. In yet another embodiment, a user sends messages to the messaging service module 103 via a first text messaging channel and receives messages from the messaging service module 103 via a second text messaging channel.

One advantage of using various text messaging channels to provide the messaging service is that it allows users to participate in the messaging service using different user devices via different text messaging channels. For example, the messaging service module 103 provides the messaging service using a channel via an application for a smart phone to a user that owns the smart phone. The messaging service module 103 also provides the messaging service using a channel via SMS to a user that owns a dump phone with an SMS enabled phone number. Persons having ordinary skill in the art will recognize that other advantages by using different text messaging channels are possible. The messaging service module 103 is further described below with reference to FIG. 2.

The messaging server module 103 stores information associated with the messaging server in a storage device, such as the messaging storage 141 on the social network server 101. For example, the messaging storage 141 stores one or more of a set of community attributes for a community, messages shared in a community and profile information of users that sign up for the messaging service such as an email address and a phone number, etc.

Messaging Service Module

Figure 2:
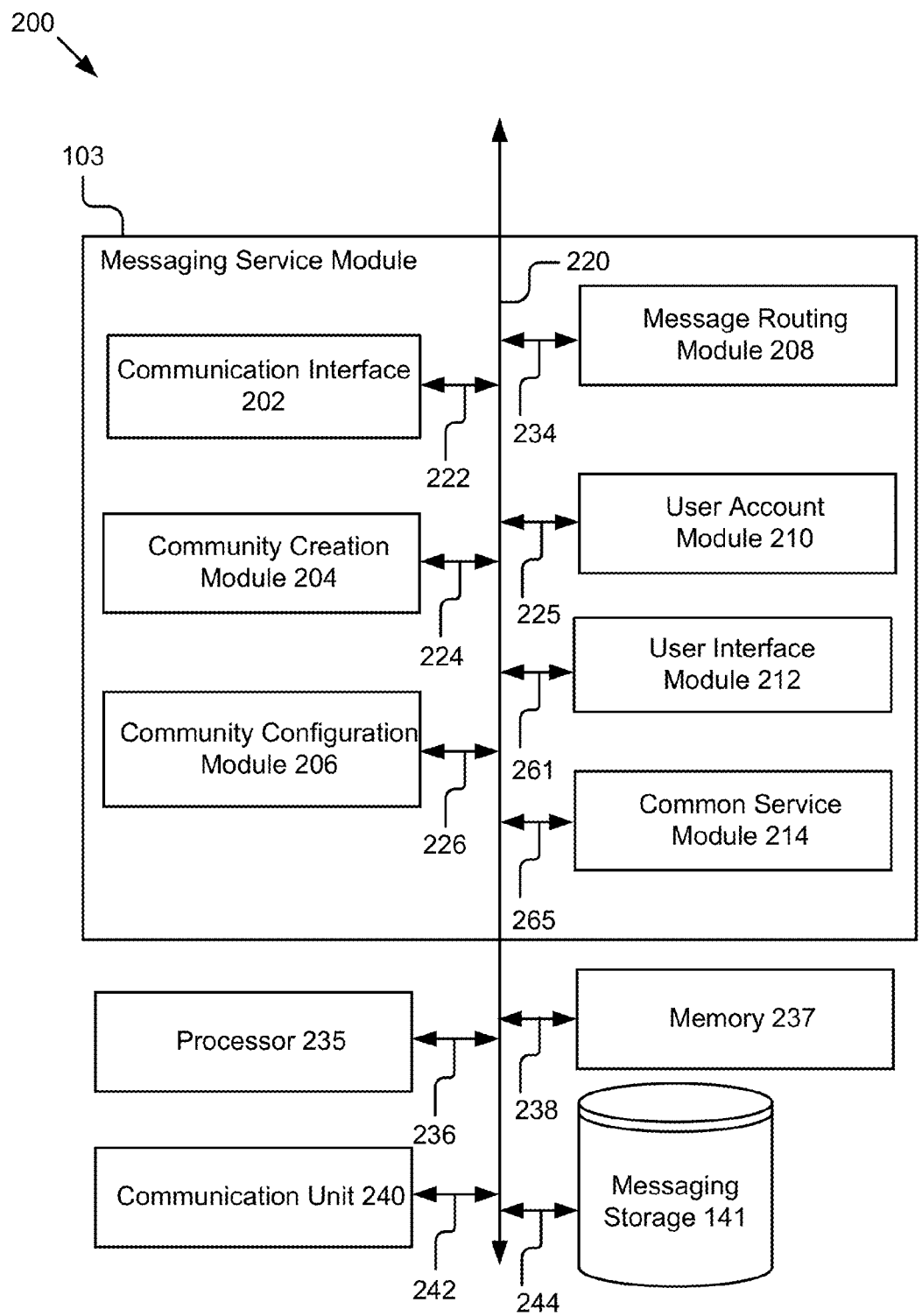
FIG. 2 is a block diagram illustrating one embodiment of a messaging service module.

Referring now to FIG. 2, the messaging service module 103 is shown in more detail. FIG. 2 is a block diagram of a computing device 200 that includes the messaging service module 103, a memory 237, a processor 235 and storage 141. In one embodiment, the computing device 200 is a social network server 101. In another embodiment, the computing device 200 is a third-party server 107. In yet another embodiment, the computing device 200 is a user device 115a.

The processor 235 comprises an arithmetic logic unit, a microprocessor, a general purpose controller or some other processor array to perform computations and provide electronic display signals to a display device. The processor 235 is coupled to the bus 220 for communication with the other components via signal line 236. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by the processor 235. The memory 237 is coupled to the bus 220 for communication with the other components via signal line 238. The instructions and/or data may comprise code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 240 receives data from the user devices 115, the third-party server 107 and/or the social network server 101 depending upon where the messaging service application 103 is stored. The communication unit 240 transmits the data to the messaging service application 103. The communication unit 240 is coupled to the bus 220 via signal line 242. In one embodiment, the communication unit 240 includes a port for direct physical connection to the network 105 or to another communication channel. For example, the communication unit 240 includes a USB, SD, CAT-5 or similar port for wired communication with the network 105. In another embodiment, the communication unit 240 includes a wireless transceiver for exchanging data with the network 105, or with another communication channel, using one or more wireless communication methods, such as IEEE 802.11, IEEE 802.16, BLUETOOTH®, near field communication (NFC) or another suitable wireless communication method. In one embodiment, the communication unit 240 includes a NFC chip that generates a radio frequency (RF) for short-range communication.

In one embodiment, the messaging service module 103 comprises a communication interface 202, a community creation module 204, a community configuration module 206, a message routing module 208, a user account module 210, a user interface module 212 and a common service module 214.

The communication interface 202 is software including routines for handling communications between the messaging service module 103 and other components of the system 100. In one embodiment, the communication interface 202 is a set of instructions executable by the processor 235 to provide the functionality described below for handling communications between components of the messaging service module 103 and other components of the system 100. In another embodiment, the communication interface 202 is stored in the memory 237 of the computing device 200 and is accessible and executable by the processor 235. In either embodiment, the communication interface 202 is adapted for cooperation and communication with the processor 235 and other components of the computing device 200 via signal line 222.

The communication interface 202 receives information from users via the communication unit 240 and sends the information to other components of the messaging service module 103. For example, the communication interface 202 receives a sign-up request from a user to register for the messaging service and sends the sign-up request to the user account module 210. Further examples of information received from users and sent to other components of the messaging service module 103 by the communication interface 202 include, but are not limited to, application information provided by a user to register for the messaging service, an account configuration request from a user to configure the user account, a community creation request from a user to create a new community, a community configuration request from a member to configure a community and a message received from a member for delivery to other members of the community. Persons of ordinary skill in the art will recognize that other information received from users by the communication interface 202 is possible.

The communication interface 202 also receives information from other components of the messaging service module 103 and sends the information to users via the communication unit 240. For example, the communication interface 202 receives a welcome message from the community configuration module 206 and sends the welcome message to a new member of a community. Further examples of information received from other components of the messaging service module 103 and sent to users by the communication interface 202 include, but are not limited to, a notification confirming creation of a new community, a welcome message to a new member of a community, a notification confirming configuration changes in a community, a message to be delivered to other members of a community and data for generating a graphic representation of a user interface. Persons of ordinary skill in the art will recognize that other information sent to users by the communication interface 202 is also possible.

The user account module 210 is software including routines for creating a user account and associating the user account with a community. In one embodiment, the user account module 210 is a set of instructions executable by the processor 235 to provide the functionality described below for creating and setting a user account. In another embodiment, the user account module 210 is stored in the memory 237 of the computing device 200 and is accessible and executable by the processor 235. In either embodiment, the user account module 210 is adapted for cooperation and communication with the processor 235 and other components of the computing device 200 via signal line 225.

In one embodiment, the user account module 210 receives a sign-up request from a user via the communication interface 202 and generates a user account for the user in response to the request. The user fills out an application form and accepts terms and conditions for the messaging service. In one embodiment, a user signs up with the messaging service by linking his or her account in a password system to the messaging service. The password system refers to a system that controls access to services provided by Google® such as email services, social network services and business applications. The user account module 210 sends a welcome message to the user after the user successfully signs up for the messaging service. In one embodiment, the user signs into the messaging service using the same user account from one or more user devices 115a . . . 115n and receives messages or updates in all of the one or more user devices 115a . . . 115n.

The user account module 210 stores profile information of the user in the messaging storage 141 that is communicatively coupled to the bus 220 via signal line 244. The profile information includes one or more of a user account in the password system, a phone number, a pin number that is automatically generated, a preferred text messaging channel (e.g., a text messaging channel to deliver messages or updates to the user), a user name, one or more nicknames, a notification preference (e.g., audible, audible and vibration and vibration only, etc.), a location of the user, a status of the user and other information provided in the application form. In one embodiment, the user has a user name for the user account and different nicknames in different communities for the same user account. The nickname is automatically displayed for a user instead of the user's full name unless the user changes the setting. Each nickname is unique within a community. If two people want to use the same nickname, the second person to join a community selects a different nickname for that community. In another embodiment, the messaging channel default is SMS until the user upgrades to a phone client application that is downloaded to the user device 115. In one embodiment, the phone client application is available on an application store. Once the user qualifies for receiving information for a rich client, the user receives a last message on the SMS channel that informs the user that SMS is being turned off but the user can reactivate the SMS channel by sending back a #stayon command. In one embodiment, the status includes multiple options and is different depending on the community. Examples of the status include active, exiting a community, temporarily muting a community and banned from a community. If messages sent through the SMS channel start to fail, the user is notified via an email and the user account module 210 updates the phone number to indicate that it is no longer active.

In yet another embodiment, the user account module 210 allows the user to associate the messaging service module 103 with the social network application 109. The user account module 210 then imports information from the social network application 109 such as a list of friends and the relationships between the user and the friends, i.e. a social graph.

The user account module 210 configures the user account in response to user requests. The user account module 210 retrieves the profile information of the user from the messaging storage 141, updates the profile information according to the request and stores the updated profile information in the messaging storage 141. For example, the user account module 210 receives a request from a user to update the phone number with a new phone number attached to the request. In one embodiment, the request is received via SMS with a hashtag command. For example, #nickname [new nickname] is a command to update the user's nickname and #rename [old name] [new name] is a command to update the user's name. The user account module 210 retrieves the profile information of the user and updates the profile information using the new phone number. In another embodiment, the user account module 210 receives user updates from the user device 115, such as the user's current location, which is added to the profile and used to personalize the communities, such as a community for reporting the weather that will send messages with weather reports for the user's most current location.

The community creation module 204 is software including routines for creating a community. In one embodiment, the community creation module 204 is a set of instructions executable by the processor 235 to provide the functionality described below for creating a community. In another embodiment, the community creation module 204 is stored in the memory 237 of the computing device 200 and is accessible and executable by the processor 235. In either embodiment, the community creation module 204 is adapted for cooperation and communication with the processor 235 and other components of the computing device 200 via signal line 224.

The community creation module 204 receives a community creation request from a user via the communication interface 202. The community creation module 204 processes the request and prompts the user to input a set of community attributes such as an owner, a community name and one or more members. The community creation module 204 generates a community based at least in part on the set of community attributes and assigns a unique community number to the community.

The community number is not reused for the member so that the member can add the number to the member's contact list and name it according to the group of people it represents. For example, the name is "Bros" for the user's male friends and the user receives texts that appear on the phone as coming from "Bros." Members of the community communicate with each other by sending messages to the community number. This allows people to communicate with each other without exposing the members' phone numbers.

The user that initiates the community creation request is the owner of the community. Owners have the ability to rename a communication, remove a user from the community and they are automatically made a member of the community. The owner provides the set of community attributes to the community creation module 204. In one embodiment, the owner provides his or her profile information such as his or her phone number and user name to the community creation module 204. In another embodiment, the owner gives permission to the community creation module 204 to access his or her profile information stored in the messaging storage 141. The owner also provides profile information of other users to the community creation module 204 so that the community creation module 204 adds the other users as members of the community. For example, the owner provides one or more of a phone number, a user name and an email address of a user to the community creation module 204 and the community creation module 204 adds the user as a member of the community.

The community creation module 204 stores the set of community attributes including the community number in the messaging storage 141 and prompts the owner to send a welcome message to other members of the community. In one embodiment, a welcome message is automatically generated by the community creation module 204 and sent to all the members of the community. The welcome message includes one or more of the number for sending a reply, an introduction of the messaging service including an explanation of using one phone number per messaging circle, a guideline to use the messaging service including a list of commands, an introduction of the community including the owner and the other members that are introduced with their nicknames or full names, an encouragement to add friends to the community, a notification that a smart phone application version is available and a request for the user to provide the user's name in a reply text.

In one embodiment, a community is created using a channel via SMS. For example, a user sends a community creation request to the community creation module 204 using an SMS message and the community creation module 204 generates a community in response to the SMS message. The SMS message includes a command that is designated with a hash tag such as "#new [community name]." The portion "[community name]" which provides a name for the community is optional. The community creation module 204 processes the command included in the message and prompts the user via an SMS message to input a set of community attributes. The community creation module 204 creates a community based at least in part on the set of community attributes and assigns a community number to the community. The community creation module 204 sends an SMS message to the user confirming that the community was successfully generated and prompts the user to add one or more members to the community using a command such as "#add [community number] [user name or nickname]."

In another embodiment, the command for adding a user is "#add [community number]." The community creation module 204 replies to the message with "Thanks for adding [community number], what should this user be called? Until a name is given, they will not be added." The user then responds with the name or nickname for the user. Once the user is added, the community creation module 204 replies to the user, noting the successful creation and the community creation module 204 sends a notification to other members to alert them about the new member.

In one embodiment, the community configuration module 206 limits the number of groups and the group size of a community. The limitations are designed to prevent abuse and avoid having groups that are so large that they become less relevant.

In another embodiment, a community is created using a channel via an application in a smart phone or a channel via a website. For example, a user clicks a button on an application in a smart phone or a website presented in a browser 119 and a community creation request is automatically sent to the community creation module 204. The community creation module 204 processes the request and generates a community based at least in part on the request and a set of community attributes. In one embodiment, the application in the smart phone automatically searches an address book stored in the smart phone and selects some or all of the contacts in the address book to be added as members of the community. In another embodiment, the user looks up an address book in the smart phone and selects some contacts to be added as members in the community. In either embodiment, the application sends the selected contacts to the community creation module 204 as a set of community attributes. In yet another embodiment, the community creation module 204 instructs the user interface module 212 to generate a user interface to display on the application or the website. The user manually inputs the set of community attributes via the user interface. The user interface module 212 is described below in more detail.

In one embodiment, the community creation module 204 generates communities for one-way transmission of information. For example, the community creation module 204 creates a community for a musician to send messages out to fans, a community for sending promotions to the members or a community for sending out weather reports. In yet another embodiment, the community creation module 204 creates a community for medical purposes. For example, there is a medical alert community that alerts people in a specific location and/or people at a specific time. For example, everyone who went through the San Francisco Airport on July 1 is alerted that a patient who contracted the bird flu traveled through the airport on that day. In another example, there is a pharmacy community that alerts the user via SMS that a prescription is ready. In yet another example, a doctor community is used in an area where doctors are uncommon to alert patients that the doctor is in town.

In one embodiment, the community creation module 204 generates a new community based on the activity in a pre-existing community. For example, when users in a community start a thread about going to the movies, the community creation module 204 generates a new community for making arrangements to view the movie.

In another embodiment, the community creation module 204 generates a new community in response to receiving a command via the SMS channel that states "#copy [community name]." The community creation module 204 creates a new community from the members of the current community and replies to the user to notify the user of the creation and prompt the user to add additional users using the #add command.

In yet another embodiment, the community creation module 204 generates a community that is authenticated by a third-party server 107. For example, the third-party server 107 authenticates a certain email address, such as first.lastname@gmail.com or first.lastname@college.edu. In another example, the third party provides the user with a passcode for accessing the community. As a result, the community creation module 214 helps filter public conversations so that the user is only viewing messages related to, for example, a school event.

The community configuration module 206 is software including routines for configuring a community. In one embodiment, the community configuration module 206 is a set of instructions executable by the processor 235 to provide the functionality described below for configuring a community. In another embodiment, the community configuration module 206 is stored in the memory 237 of the computing device 200 and is accessible and executable by the processor 235. In either embodiment, the community configuration module 206 is adapted for cooperation and communication with the processor 235 and other components of the computing device 200 via signal line 226.

The community configuration module 206 receives a community configuration request via the communication interface 202 from a member of a community and configures the community in response to the request. In one embodiment, the community configuration module 206 retrieves a set of community attributes for a community from the messaging storage 141, performs one or more configurations to the community and updates the set of community attributes based at least in part on the one or more configurations. The community configuration module 206 stores the updated community attributes in the messaging storage 141.

The one or more configurations made to the community include one or more of adding a new member to the community, removing a member from the community, changing member status, stopping to receive updates in the community, proceeding to receive updates in the community, generating a photo album, voting to remove a member from the community, temporarily blocking a conversation room in the community, changing a notification preference for a member, changing a nickname for a member and providing a web view for messages. In one embodiment, the community configuration module 206 adds a user to a community in response to receiving a text from the user that is sent to the community number. The community configuration module 206 adds the user and sends a welcome message to the user. The community configuration module 206 generates a photo album in response to receiving an image uploaded by a user. If the community is private, the photo album is only viewable by members of the community.

In one embodiment, the community configuration module 206 receives a request to configure a community as a slice of the complete community. For example, instead of viewing messages from all members of a community, the user can see only her friend, her friends and friends of friends, messages from people in a geographical area, etc. In one embodiment, groups corresponding to a geographic location automatically change as a user travels such that when the user leaves New York City to fly to Mountain View, Calif., the groups change from NYC to Mountain View.

In one embodiment, a community is configured using a channel via an application in a smart phone or a channel via a website. For example, a member of a community clicks a button shown on an application in a smart phone or a website presented in a browser 119 and a community configuration request is automatically sent to the community configuration module 206. The community configuration module 206 processes the request and instructs the user interface module 212 to generate a user interface to display on the application or the website allowing the member to configure the community.

In another embodiment, a community is configured using a channel via SMS. For example, a member of a community sends a community configuration request to the community configuration module 206 using an SMS message and the community configuration module 206 configures the community in response to the SMS message. The SMS message includes a command to configure a community. For example, the SMS message includes a command such as "#add [community number] [user name]" to add a user with the specified user name to a community with the specified community number.

Members of a community can also instruct the community configuration module 206 to ban another member. In one embodiment, the owner confirms the ban before it becomes effective. In another embodiment, a threshold number of user request a ban of another member before it becomes effective. In addition, members can leave a community to stop receiving community messages and temporarily block community messages (mute). In one embodiment, the member requests the community configuration module 206 to generate a link to a web view. If this command is issued within a community, the community configuration module 206 transmits a link that points to the community. If the command is issued outside a community, the community configuration module 206 transmits a link that points the user to a general overview page.

Additional commands to configure a community using SMS messages are listed below in Table 1. The community configuration module 206 processes the command included in the message and configures the community based at least in part on the command. An error message is sent to the member if the member uses an incorrect command in the SMS message. In one embodiment, the community configuration module 206 sends a confirmation message to the member after successfully configuring the community.

TABLE 1

Commands to Configure a Community Using SMS Messages

| Commands | Functionalities of Commands |
| --- | --- |
| #add [community number] [user name] | Adding a user with the specified user name to a community with the specified community number. |
| #communities | Inquiring what communities a user is a member of. An SMS message including all the communities that the user is a member of and the community numbers is sent to the inquiring user. |
| #copy [community name] | Creating a new community by copying members from a community with the specified name to the new community. |
| #download | Request for a link to an application store for downloading an application to receive the community messages in a rich client format. |
| #help | Requesting help. In one embodiment, a list of commands and their functionalities are sent to a user via an SMS message |
| #kick [user name] | Vote to block a specific member from sending community messages. This gives members an ability to prevent bad actors from spamming a circle. |
| #join [community number] | Joining a community with the specified community number. |
| #new [community name] | Creating a community and naming the community with the specified community name. |
| #start [community number] | Starting to receive message updates from a community with the specified community number. |
| #stayon [community number] | If a user switches to a rich client and the SMS channel is turned off, texting #stayon turns the SMS channel back on. |
| #stop [community number] | Stopping to receive message updates from a community with the specified community number. |

In one embodiment, the community configuration module 206 collects metrics about the communities and reports these metrics to the owner or other members upon request. For example, the community configuration module 206 records a number of communities per user, an average number of users per communities, an average number of communities per user, a number of messages sent per user in all time, a number of messages sent per user per day, an average number of messages sent per user in all time, an average number of messages sent per user per day, a number of messages sent total, an average number of messages sent per day (including a notation of the day of the week to identify which is the biggest messages day of the week), a number of messages received total, an average number of messages received per day, a number of messages per messaging circle per user per day, an average number of messages per messaging circle per user per day and an average number of messages per community per day. In one embodiment, the community configuration module 206 also displays all the metrics above as divided according to the communication channel used (e.g. SMS, a type of smart phone, the web, etc.). In one embodiment, the community configuration module 206 suggests communities to a user based on metrics. For example, the community configuration module 206 recommends communities to the user that have a number of friends in the community, that the user visited recently or based on the activity in the community (e.g. popular communities).

In yet another embodiment, the community configuration module 206 determines how much the user has read and marks messages as read based on the information. For example, for the application or website, the community configuration module 206 receives an indication of how far down the page the user read. For the SMS version, the community configuration module 206 receives a time that the user responds and marks everything before that point as having been read by the user.

The message routing module 208 is software including routines for routing a message in a community. In one embodiment, the message routing module 208 is a set of instructions executable by the processor 235 to provide the functionality described below for routing a message. In another embodiment, the message routing module 208 is stored in the memory 237 of the computing device 200 and is accessible and executable by the processor 235. In either embodiment, the message routing module 208 is adapted for cooperation and communication with the processor 235 and other components of the computing device 200 via signal line 234.

The message routing module 208 receives a message via the communication interface 202 from a member of a community. The message includes one or more of an identification of a source channel, a timestamp, message content, an identification of a sender (e.g., a phone number or user name of the sender), a community name and a community number. A source channel is a text messaging channel via which a message is sent to the message routing module 208 (e.g., a channel via SMS). A timestamp is a time indicating when a message is sent to the message routing module 208. A sender is a member that sends a message to the message routing module 208.

The message routing module 208 determines a community number for the community from the received message. For example, the message routing module 208 extracts the community number from the message. The message routing module 208 determines a nickname of the sender based at least in part on the community number. For example, the message routing module 208 retrieves profile information of the sender from the messaging storage 141 and selects a nickname associated with the community number from the profile information. The message routing module 208 prepends the nickname of the sender to the message.

The message routing module 208 retrieves a set of community attributes from the messaging storage 141 based at least in part on the community number and determines other members (e.g., all members of the community except the sender) in the community. In one embodiment, the message routing module 208 determines other active members (e.g., all active members of the community except the sender) in the community. An active member is a member that has an active status in a community. For example, an active member is a member who receives updates from or sends messages to a community.

The message routing module 208 determines a text messaging channel for each of the other members. For example, the message routing module 208 retrieves profile information for each of the other members from the messaging storage 141 and determines a preferred text messaging channel for each of the other members from the profile information. If the message is more than 160 characters, the messaging module 208 breaks the message into multiple 160 character messages and adds an indication that the message was broken into parts, such as [part 1 of X]. The message routing module 208 sends the message with the prepended nickname to each of the other members using the preferred text messaging channel. A preferred text messaging channel used to send a message from the message routing module 208 to a member of the community is a destination channel. In one embodiment, the message sent to each of the other members includes one or more of an identification of a source channel, a timestamp, message content, a nickname of a sender, a community name, a community number and an identification of a destination channel.

In one embodiment, the message routing module 208 sends the message to the community configuration module 206 and the community configuration module 206 publishes the message in a web view and provides the web view to members of the community.

In one embodiment, the message routing module 208 includes limits on the number of messages that a user sends per day. If the user exceeds the number of messages, the message routing module 208 refuses to send the additional message and notifies the user via the communication interface 202 that the user exceeded the number of messages.

The user interface module 212 is software including routines for generating a user interface that receives inputs from users and/or displays information to users. In one embodiment, the user interface module 212 is a set of instructions executable by the processor 235 to provide the functionality described below for receiving inputs from users and/or displaying information to users. In another embodiment, the user interface module 212 is stored in the memory 237 of the computing device 200 and is accessible and executable by the processor 235. In either embodiment, the user interface module 212 is adapted for cooperation and communication with the processor 235 and other components of the computing device 200 via signal line 261.

In one embodiment, the user interface module 212 provides a user interface for applications and a website that includes one or more fields, drop down boxes or other conventional graphics used by a user to input one or more of a community creation request, a community configuration request, a message, a set of community attributes and other information (e.g., a request for help information). Data inputted into the user interface is received by the communication interface 202 and stored in the messaging storage 141.

The user interface module 212 generates a community that displays a title bar with the community's name and the conversation in chronological order. Each message includes the name of the poster and a time stamp. If the information is displayed in an application or a website, an image or placeholder is displayed as associated with the user. In one embodiment, previously unviewed messages are displayed in a different color than read messages. The user interface also includes a post box that purshes the user to a posting view.

In one embodiment, the user interface includes buttons for creating a community button, searching for community names, adding the user to a community (such as a menu button to put the user on a page to enter the phone number or direct integration into a community), displaying communities (such as recent communities), displaying the names of members of the community and clicking on a community to view the conversations. For a community with an unread message, the user interface displays the number of minutes that have elapsed include the message was sent or received and the number of unread messages in the community.

In another embodiment, the user interface module 212 provides a user interface for displaying communities, messages and other information to users. In yet another embodiment, the user interface module 212 provides a user interface that displays information to users and allows the users to input information via the user interface. In one embodiment, the communities include popular communities, topical conversations and standard communities, such as a keynote community.

In one embodiment, the user interface module 212 generates a user interface that encourages users to post messages that are in small SMS chunks. In one embodiment, when the user inputs text it is displayed in black until 140 characters. After 140 characters, the user interface module 212 displays the characters in grey or red. After 300 characters, the user interface module 212 displays the characters in lighter gray or darker red.

The common service module 214 is software including routines for providing common services to users that sign up the messaging service. In one embodiment, the common service module 214 is a set of instructions executable by the processor 235 to provide the functionality described below for providing common services. In another embodiment, the common service module 214 is stored in the memory 237 of the computing device 200 and is accessible and executable by the processor 235. In either embodiment, the common service module 214 is adapted for cooperation and communication with the processor 235 and other components of the computing device 200 via signal line 265.

A common service is a service available to any users. For example, a common service is a service providing one or more of introduction information about the messaging service, guidelines for using the messaging service and help information. Persons having ordinary skill in the art will recognize that other common services are also possible. In one embodiment, the common service module 214 receives an SMS message including a command "#help" from a user and returns an SMS message including a list of commands to the user. A user accesses the common service module 214 by texting a single phone number or sending short code.

User Interface Module 212

Turning now to the user interface module 212, FIG. 3A is a graphic representation 300 of a message flow that is displayed for a user that is communicating using a SMS channel. In this example, the messages are displayed for "Wferrell" on a phone for a community of his friends that are taking a trip to Seattle.

Figure 3B:
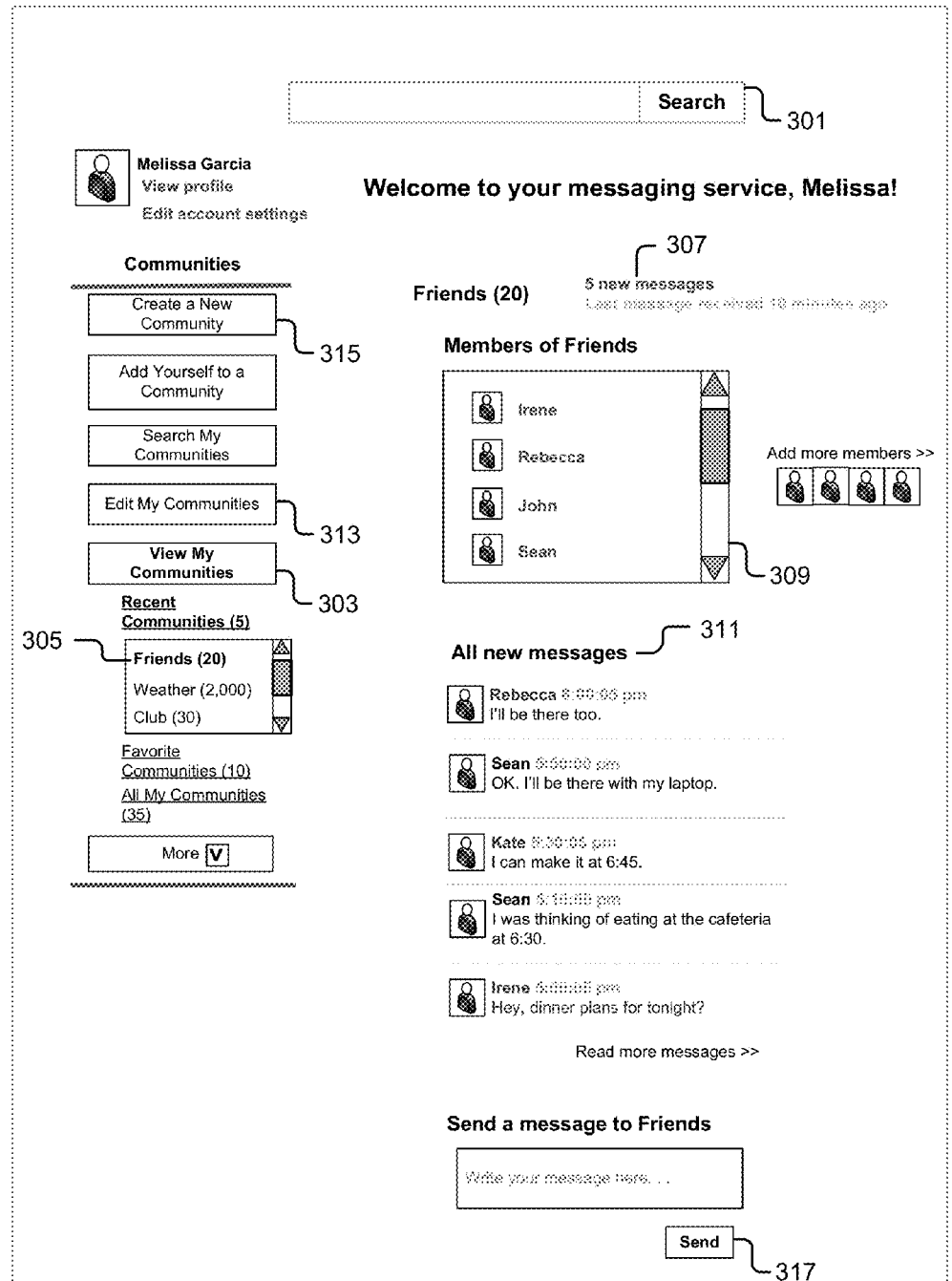
FIG. 3B is a graphic representation of an example user interface that is generated by a user interface module for providing the messaging service to a user.

FIG. 3B is a graphic representation 320 of a user interface that is generated by the user interface module 212 for displaying the messaging service to a user and allows the user to input messages or other information on an application or webpage. This is part of the Google line of products and therefore contains a search bar 301 at the top. Persons of ordinary skill in the art will recognize that other versions of the messaging service module 103 are possible that omit the search bar and are privately labeled.

The user is Melissa Garcia and the user interface allows Melissa to view all the communities that she is a member of For example, if Melissa clicks on the "View My Communities" button 303, all her communities are shown in three categories such as recent communities, favorite communities and all my communities. A recent community is a community with recent activities such as new messages. Melissa clicks on one of the recent communities, for example, "friends" 305 and information about the community "friends" is shown in the graphic representation 320. For example, the graphic representation 300 notifies Melissa that she has five new messages 307 and the last message was received 10 minutes ago. The graphic representation 300 also presents members of the "friends" community 309 and content of the new messages 311 to Melissa.

Additionally, the user interface provides a user with options to configure a community. For example, an "Edit My Communities" button 313 allows Melissa to edit her communities. Selecting this button transmits a request to the community configuration module 206. and A "Create a New Community" button 315 allows Melissa to create a new community. Selecting this button transmits a request to the community creation module 204. The user interface also allows Melissa to send a message to the community "friends" by clicking a "Send" button 317. Selecting this button transmits a request to the communication interface 202, which transmits the message to the message routing module 208.

Methods

Figure 4:
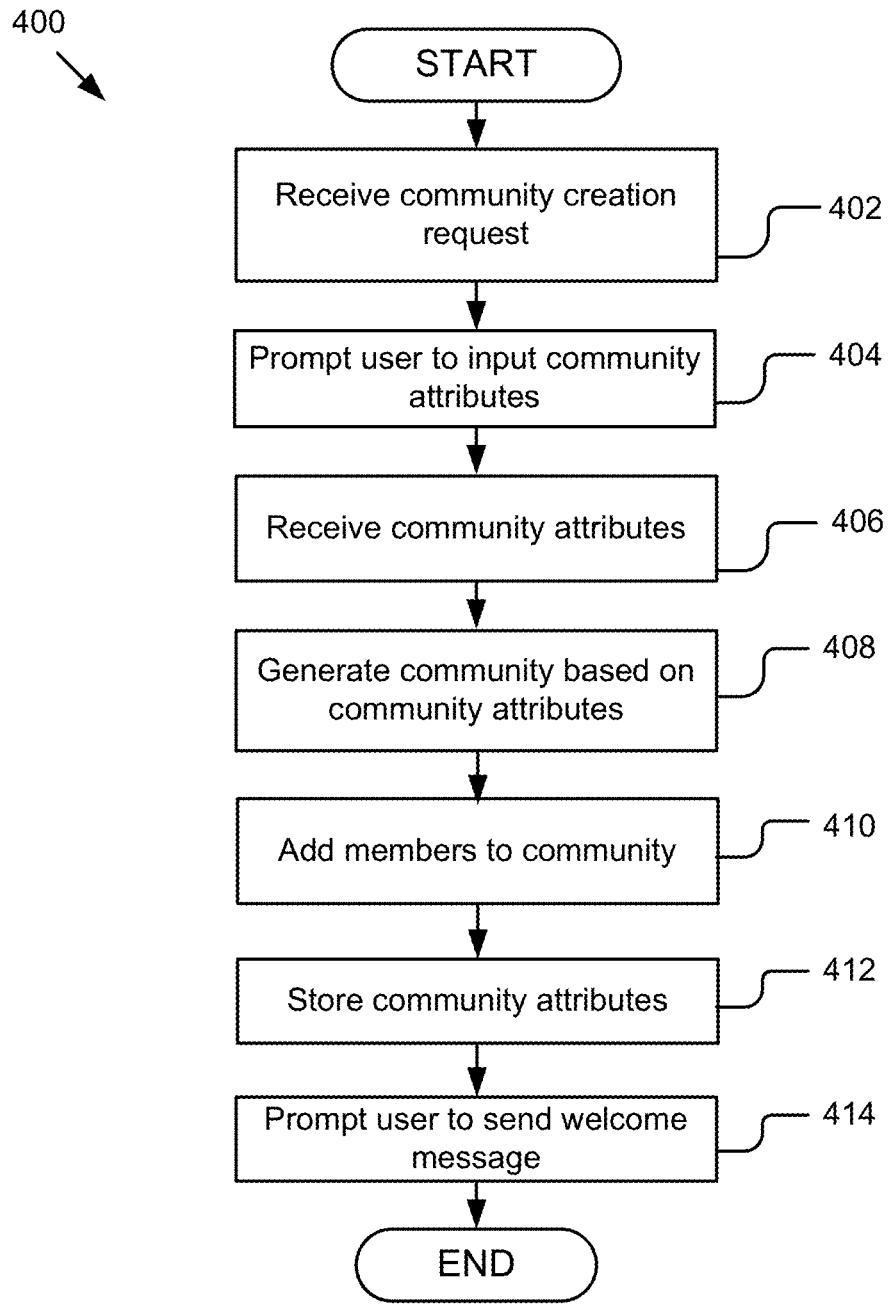
FIG. 4 is a flow diagram of one embodiment of a method for creating a messaging community.
Figure 5:
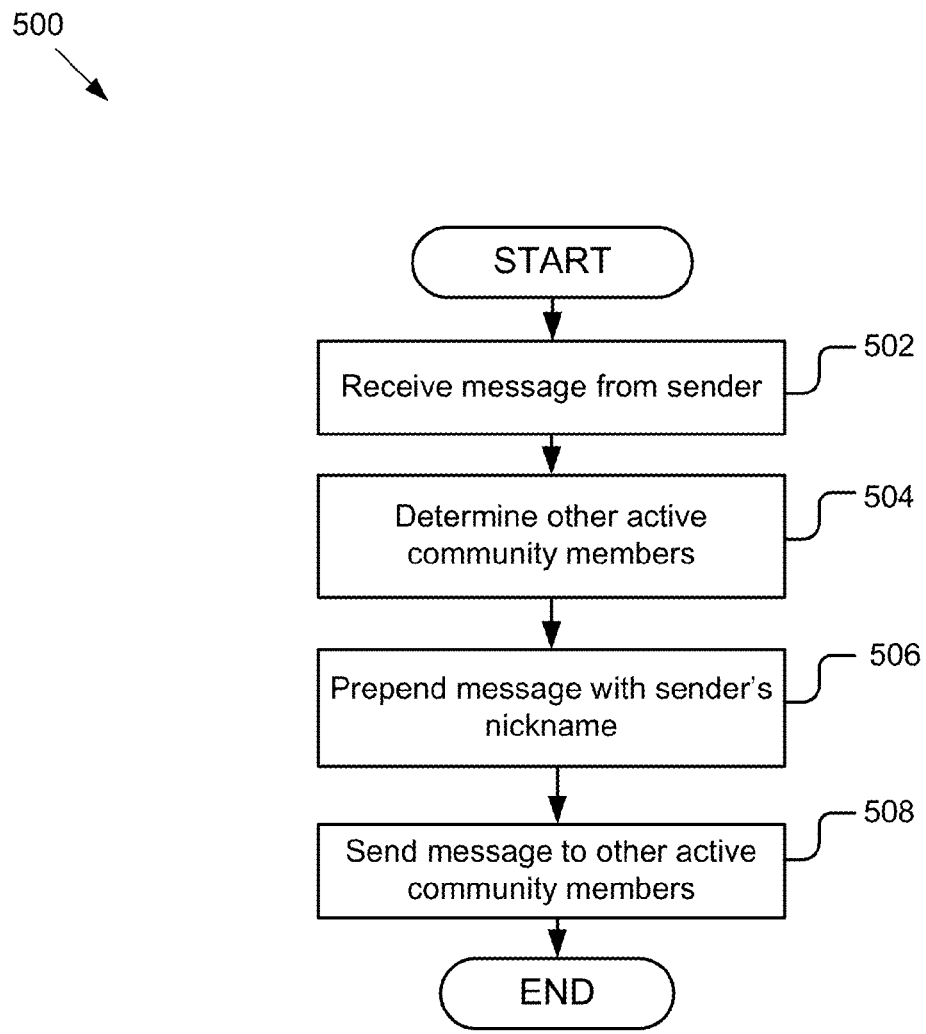
FIG. 5 is a flow diagram of one embodiment of a method for routing a message in a messaging community.
Figure 6:
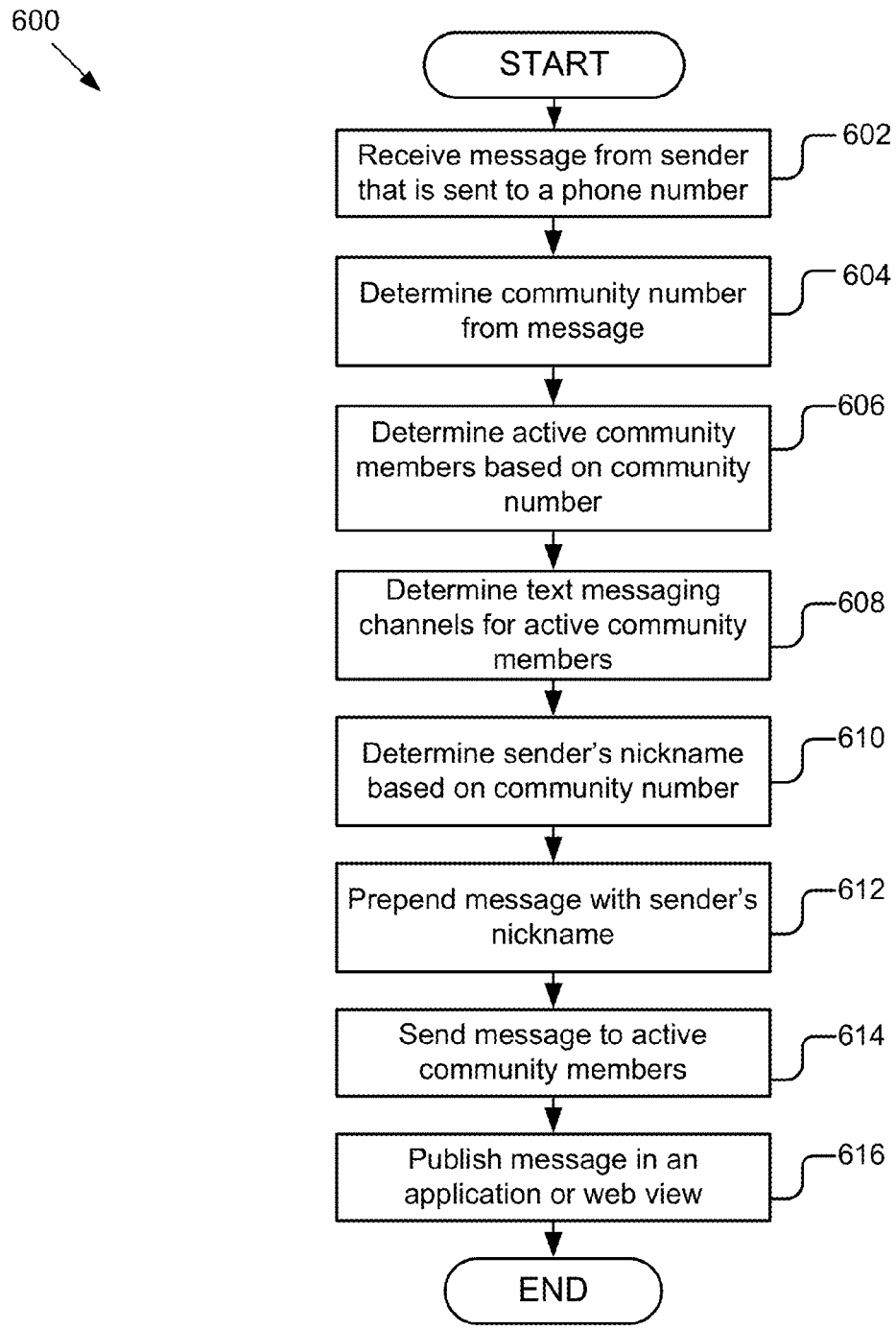
FIG. 6 is a flow diagram of another embodiment of a method for routing a message in a messaging community.

Referring now to FIGS. 4-6, various embodiments of the method of the specification will be described. FIG. 4 is a flow diagram 400 of one embodiment of a method for creating a community. The communication interface 202 receives 402 a community creation request from a user and delivers the request to the community creation module 204. The community creation module 204 prompts 404 the user to input a set of community attributes such as an owner, a community name and one or more members. In one embodiment, an application in a user device 115a . . . 115n automatically searches an address book in the user device 115a . . . 115n and sends some or all of the contacts in the address book to the community creation module 204 as a set of community attributes.

The community creation module 204 receives 406 the set of community attributes from the user device 115a . . . 115n and generates 408 a community based at least in part on the set of community attributes. The community creation module 204 assigns a community number to the community. In one embodiment, the user that initiates the community creation request is the owner of the community. The community creation module 204 prompts the user to add additional members to the community. The user sends profile information of additional users to the community creation module 204 and the community creation module 204 adds 410 the additional users as members in the community. The community creation module 204 stores 412 the set of community attributes including the community number and members of the community in the messaging storage 141. The community creation module 204 prompts 414 the user to send a welcome message to all the other members of the community and notify them that they are members of a new community.

FIG. 5 is a flow diagram 500 of one embodiment of a method for routing a message in a community. The communication interface 202 receives 502 a message from a member of a community. The member who sends the message is a sender of the message. The communication interface 202 transmits the message to the message routing module 208, which parses the message to obtain a community number and determines 504 one or more active members (except the sender) in the community based at least in part on the community number. The message routing module 208 retrieves a nickname of the sender from the messaging storage 141 and prepends 506 the message with the nickname of the sender. The message routing module 208 sends 508 the message to the one or more active members of the community via the communication interface 202, which transmits the message to the communication unit 240 for transmission to the other user devices 115.

FIG. 6 is a flow diagram 600 of another embodiment of a method for routing a message in a community. The communication interface 202 receives 602 a message from a member of a community that is sent to a phone number via a first text messaging channel. The phone number is associating with a community. The member that sends the message is the sender of the message. The communication interface 202 delivers the message to the message routing module 208. The message routing module 208 determines 604 a community number from the message. For example, the message routing module 208 extracts the community number included in the message. The message routing module 208 determines 606 one or more active members of the community based at least in part on the community number. In one embodiment, the message routing module 208 retrieves a set of community attributes from the messaging storage 141 based at least in part on the community number and obtains one or more active members from the set of community attributes.

The message routing module 208 retrieves profile information for the one or more active members from the messaging storage 141 and determines 608 one or more second text messaging channels for the one or more active members from the profile information. For example, the message routing module 208 determines a preferred text messaging channel for each of the one or more active members from the profile information.

The message routing module 208 determines 610 a nickname of the sender based at least in part on the community number and prepends 612 the message with the sender's nickname. The message routing module 208 delivers the message with the prepended nickname to the communication interface 202. The communication interface 202 sends 614 the message with the prepended nickname to the one or more active members using the one or more second text messaging channels, respectively. In one embodiment, the message routing module 208 delivers the message to the community configuration module 206 and the community configuration module 206 publishes 616 the message in an application web view. The community configuration module 206 presents the web view to members of the community.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method for providing a messaging service in a community, the method comprising:
   receiving a first message from a first member of the community using a first text messaging channel, the first message including a community number identifying the community;
   determining a first location associated with the first member;
   determining a second member of the community based at least in part on the community number and the second member's current location;
   determining one or more second text messaging channels for the second member;
   sending the first message to the second member using the one or more second text messaging channels;
   receiving a second message from a third member of the community using the first text messaging channel;
   determining a second location associated with the third member; and
   determining to send the second message to a group of members within a geographic location that encompasses the second location, the group of members excluding the second member based on the second member's current location being outside the geographic location.

2. The method of claim 1, wherein the first text messaging channel and the one or more second text messaging channels are one or more of a channel via short messaging service, a channel via an application in a smart phone and a channel via a website.

3. The method of claim 1, wherein the first message further includes an identification of the first text messaging channel, an identification of the first member and a timestamp.

4. The method of claim 1 further comprising:
   receiving a community configuration request from the first member of the community; and
   configuring the community in response to the community configuration request.

5. The method of claim 4, wherein configuring the community includes one or more of adding a new member to the community, removing a member from the community, changing a member status, stopping to receive updates in the community, proceeding to receive updates in the community, voting to remove a member from the community, temporarily blocking a conversation room in the community, changing a notification preference for a member, changing a nickname for a member and providing a web view for messages.

6. The method of claim 1 further comprising publishing the first message in a web view.

7. The method of claim 1 further comprising:
   receiving a community creation request from a user; and
   creating a new community in response to the community creation request.

8. A system for providing a messaging service in a community, the system comprising:
   a communication interface for receiving a first message from a first member of the community using a first text messaging channel, sending the first message to a second member of the community using one or more second text messaging channels, the first message including a community number identifying the community, and receiving a second message from a third member of the community using the first text messaging channel; and
   a message routing module communicatively coupled to the communication interface, the message routing module configured to:
     determine a first location associated with the first member;
     determine the second member of the community based at least in part on the community number and the second member's current location;
     determine the one or more second text messaging channels for the second member;
     determine a second location associated with the third member; and
     determine to send the second message to a group of members within a geographic location that encompasses the second location, the group of members excluding the second member based on the second member's current location being outside the geographic location.

9. The system of claim 8, wherein the first text messaging channel and the one or more second text messaging channels are one or more of a channel via short messaging service, a channel via an application in a smart phone and a channel via a website.

10. The system of claim 8, wherein the first message further includes an identification of the first text messaging channel, an identification of the first member and a timestamp.

11. The system of claim 8 further comprising:
a community configuration module communicatively coupled to the communication interface, the community configuration module receiving a community configuration request from the communication interface and configuring the community in response to the community configuration request; and
wherein the communication interface receives the community configuration request from the first member of the community.

12. The system of claim 11, wherein the community configuration module configuring the community includes one or more of adding a new member to the community, removing a member from the community, changing a member status, stopping to receive updates in the community, proceeding to receive updates in the community, voting to remove a member from the community, temporarily blocking a conversation room in the community, changing a notification preference for a member, changing a nickname for a member and providing a web view for messages.

13. The system of claim 11, wherein the community configuration module is further configured to publish the first message in a web view.

14. The system of claim 8 further comprising:
a community creation module communicatively coupled to the communication interface, the community creation module receiving a community creation request from the communication interface and creating a new community in response to the community creation request; and
wherein the communication interface receives the community creation request from a user.

15. A computer program product comprising a non-transitory computer usable medium including a computer readable program, wherein the computer readable program when executed on a computer causes the computer to:
receive a first message from a first member of a community using a first text messaging channel, the first message including a community number identifying the community;
determine a first location associated with the first member;
determine a second member of the community based at least in part on the community number and the second member's current location;
determine one or more second text messaging channels for the second member;
send the first message to the second member using the one or more second text messaging channels;
receive a second message from a third member of the community using the first text messaging channel;
determine a second location associated with the third member; and
determine to send the second message to a group of members within a geographic location that encompasses the second location, the group of members excluding the second member based on the second member's current location being outside the geographic location.

16. The computer program product of claim 15, wherein the first text messaging channel and the one or more second text messaging channels are one or more of a channel via short messaging service, a channel via an application in a smart phone and a channel via a website.

17. The computer program product of claim 15, wherein the first message further includes an identification of the first text messaging channel, an identification of the first member and a timestamp.

18. The computer program product of claim 15 further comprising:
receiving a community configuration request from the first member of the community; and
configuring the community in response to the community configuration request.

19. The computer program product of claim 18, wherein configuring the community includes one or more of adding a new member to the community, removing a member from the community, changing a member status, stopping to receive updates in the community, proceeding to receive updates in the community, voting to remove a member from the community, temporarily blocking a conversation room in the community, changing a notification preference for a member, changing a nickname for a member and providing a web view for messages.

20. The computer program product of claim 15 further comprising:
receiving a community creation request from a user; and
creating a new community in response to the community creation request.

* * * * *